(12) United States Patent
Raghavan et al.

(10) Patent No.: US 11,671,847 B2
(45) Date of Patent: Jun. 6, 2023

(54) TECHNIQUES FOR BEAM TYPE INFORMATION REPORTING FOR HIERARCHICAL BEAMFORMING IN WIRELESS COMMUNICATION

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/135,360

(22) Filed: Dec. 28, 2020

(65) Prior Publication Data

US 2022/0210666 A1 Jun. 30, 2022

(51) Int. Cl.
*H04B 7/0413* (2017.01)
*H04W 16/28* (2009.01)

(52) U.S. Cl.
CPC .......... *H04W 16/28* (2013.01); *H04B 7/0413* (2013.01)

(58) Field of Classification Search
CPC ............................ H04W 16/28; H04B 7/0413
See application file for complete search history.

(56) References Cited

U.S. PATENT DOCUMENTS

2019/0140713 A1\* 5/2019 Cheng .................. H04B 7/0473
2020/0367075 A1 11/2020 Nagaraja et al.

FOREIGN PATENT DOCUMENTS

WO 2018035334 A1 2/2018

OTHER PUBLICATIONS

International Search Report and Written Opinion—PCT/US2021/072492—ISA/EPO—dated May 11, 2022.
Partial International Search Report—PCT/US2021/072492—ISA/EPO—dated Mar. 15, 2022.

\* cited by examiner

*Primary Examiner* — Rahel Guarino
(74) *Attorney, Agent, or Firm* — Dalei Dong; Harrity & Harrity, LLP

(57) ABSTRACT

Various aspects of the present disclosure generally relate to wireless communication. In some aspects, a first wireless communication device may receive, from a second wireless communication device, beam type information associated with at least one beam used by the second wireless communication device for a hierarchical beamforming process, wherein the beam type information includes an indication of a number of beam types used in the hierarchical beamforming process and an indication of a number of beams of each of the beam types used in the hierarchical beamforming process. The first wireless communication device may perform a wireless communication action based at least in part on the beam type information. Numerous other aspects are described.

30 Claims, 11 Drawing Sheets

TECHNIQUES FOR BEAM TYPE INFORMATION REPORTING FOR HIERARCHICAL BEAMFORMING IN WIRELESS COMMUNICATION

FIELD OF THE DISCLOSURE

Aspects of the present disclosure generally relate to wireless communication and to techniques and apparatuses for beam type information reporting for hierarchical beamforming in wireless communication.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device includes receiving, from a second wireless communication device, beam type information associated with at least one beam used by the second wireless communication device for a hierarchical beamforming process, wherein the beam type information includes an indication of a number of beam types used in the hierarchical beamforming process and an indication of a number of beams of each of the beam types used in the hierarchical beamforming process; and performing a wireless communication action based at least in part on the beam type information.

In some aspects, the beam types are based at least in part on an antenna array architecture of the second wireless communication device.

In some aspects, the beam type information includes at least one parameter associated with relative array gain corresponding to a first beam type, relative to a second beam type.

In some aspects, the beam type information includes an indication that the at least one parameter corresponds to at least one of: a relative number of antenna dimensions across azimuth and elevation used for each beam type of a plurality of beam types, or an effective number of antenna dimensions across azimuth and elevation used for each beam type of a plurality of beam types.

In some aspects, the beam type information includes an indication that the at least one parameter corresponds to at least one of: an antenna panel, an antenna module, a coverage area of the antenna panel, or a coverage area of the antenna module.

In some aspects, the beam type information includes an indication that the at least one parameter corresponds to a frequency range of coverage associated with the antenna module.

In some aspects, the method includes transmitting, to the second wireless communication device, a beam type information reporting configuration that indicates the at least one beam type.

In some aspects, the beam type information reporting configuration further comprises reporting scheduling information.

In some aspects, reception of the beam type information comprises receiving the beam type information based at least in part on a determination of an activation of the second wireless communication device.

In some aspects, the beam type information is carried in a capability field.

In some aspects, reception of the beam type information comprises receiving the beam type information based at least in part on a determination of an updated beam type.

In some aspects, the beamforming process comprises a hybrid beamforming process performed in a hierarchical beamforming manner with different beam types used in each step of the hierarchy of the hierarchical beamforming.

In some aspects, a method of wireless communication performed by a first wireless communication device includes receiving, from a second wireless communication device, beam type information associated with at least one beam used by the second wireless communication device for a hierarchical beamforming process, wherein the beam type information includes an indication of a number of beam types used in the hierarchical beamforming process and at least one parameter associated with a relative array gain across beams corresponding to the beam types; and performing a wireless communication action based at least in part on the beam type information.

In some aspects, the beam type information includes an indication of a number of beams of each of the beam types used in the hierarchical beamforming process.

In some aspects, the at least one parameter associated with the relative array gain comprises an effective isotropic radiated power (EIRP) difference across the beams corresponding to the beam types.

In some aspects, the beam types are based at least in part on an antenna array architecture of the second wireless communication device.

In some aspects, the beam type information includes an indication that the at least one parameter corresponds to at least one of: a relative number of antenna dimensions used for each beam type of a plurality of beam types, or an effective number of antenna dimensions used for each beam type of a plurality of beam types.

In some aspects, the beam type information includes an indication that the at least one parameter corresponds to at least one of: an antenna panel, an antenna module, a coverage area of the antenna panel, or a coverage area of the antenna module.

In some aspects, the beam type information includes an indication that the at least one parameter corresponds to a frequency range of coverage associated with the antenna module.

In some aspects, the method includes transmitting, to the second wireless communication device, a beam type information reporting configuration that indicates the at least one beam type.

In some aspects, the beam type information reporting configuration further comprises reporting scheduling information.

In some aspects, reception of the beam type information comprises receiving the beam type information based at least in part on a determination of an activation of the second wireless communication device.

In some aspects, the beam type information is carried in a capability field.

In some aspects, reception of the beam type information includes receiving the beam type information based at least in part on a determination of an updated beam type.

In some aspects, the beamforming process comprises a hybrid beamforming process performed in a hierarchical beamforming manner with different beam types used in each step of the hierarchy of the hierarchical beamforming.

In some aspects, a method of wireless communication performed by a first wireless communication device includes transmitting, to a second wireless communication device, beam type information associated with at least one beam used by the wireless communication device for a hierarchical beamforming process, wherein the beam type information includes an indication of a number of beam types used in the hierarchical beamforming process and an indication of a number of beams of each of the beam types used in the hierarchical beamforming process; and communicating on a wireless communication network based at least in part on the beam type information.

In some aspects, a method of wireless communication performed by a first wireless communication device includes transmitting, to a second wireless communication device, beam type information associated with at least one beam used by the wireless communication device for a hierarchical beamforming process, wherein the beam type information includes an indication of a number of beam types used in the hierarchical beamforming process and at least one parameter associated with a relative array gain across beams corresponding to the beam types; and communicating on a wireless communication network based at least in part on the beam type information.

In some aspects, a first wireless communication device for wireless communication includes a memory; and one or more processors operatively coupled to the memory, the memory and the one or more processors configured to: receive, from a second wireless communication device, beam type information associated with at least one beam used by the additional wireless communication device for a hierarchical beamforming process, wherein the beam type information includes an indication of a number of beam types used in the hierarchical beamforming process and an indication of a number of beams of each of the beam types used in the hierarchical beamforming process; and perform a wireless communication action based at least in part on the beam type information.

In some aspects, a first wireless communication device for wireless communication includes a memory; and one or more processors operatively coupled to the memory, the memory and the one or more processors configured to: receive, from a second wireless communication device, beam type information associated with at least one beam used by the second wireless communication device for a hierarchical beamforming process, wherein the beam type information includes an indication of a number of beam types used in the hierarchical beamforming process and at least one parameter associated with a relative array gain across beams corresponding to the beam types; and perform a wireless communication action based at least in part on the beam type information.

In some aspects, a first wireless communication device for wireless communication includes a memory; and one or more processors operatively coupled to the memory, the memory and the one or more processors configured to: transmit, to a second wireless communication device, beam type information associated with at least one beam used by the wireless communication device for a hierarchical beamforming process, wherein the beam type information includes an indication of a number of beam types used in the hierarchical beamforming process and an indication of a number of beams of each of the beam types used in the hierarchical beamforming process; and communicate on a wireless communication network based at least in part on the beam type information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
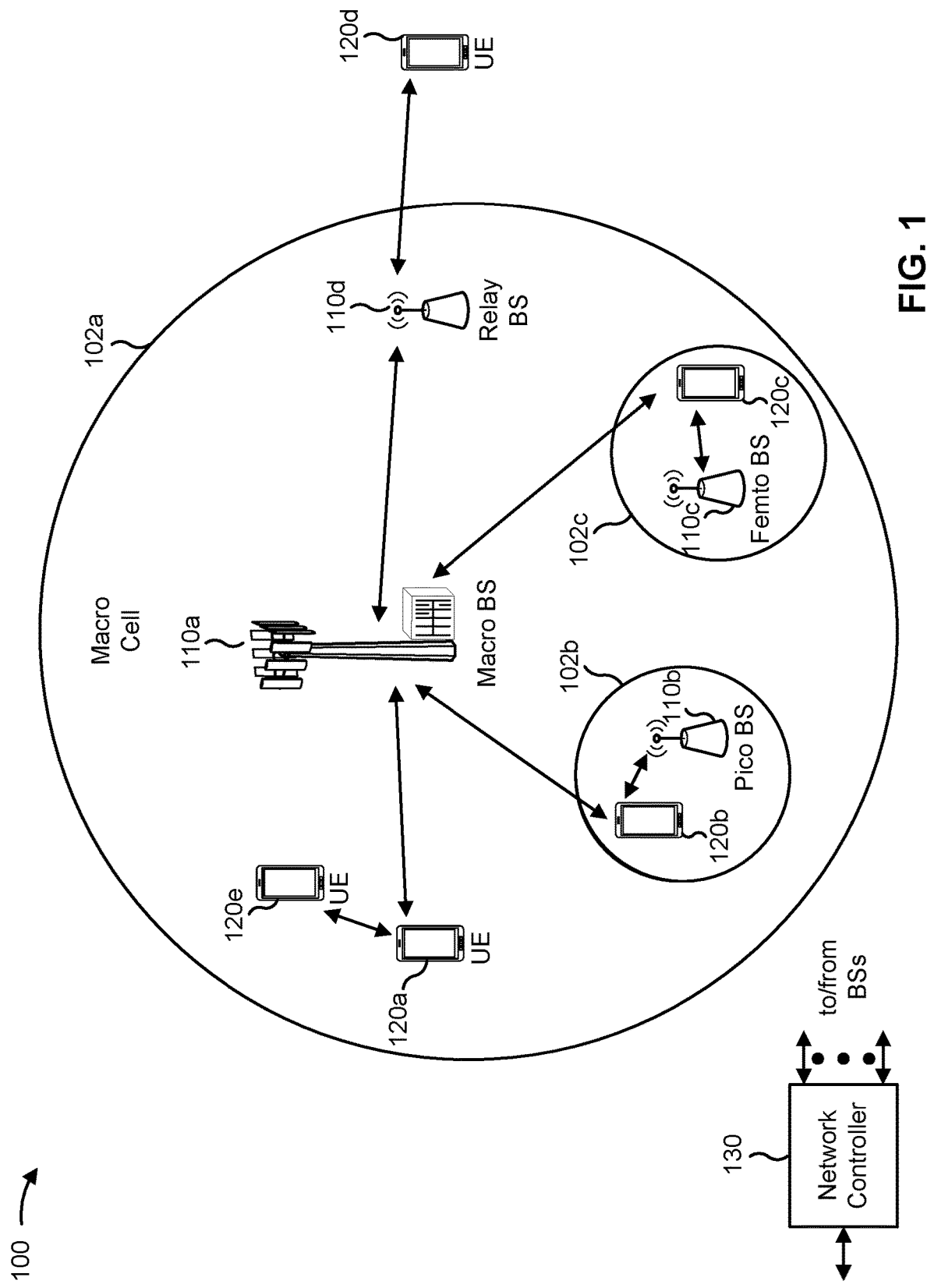
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
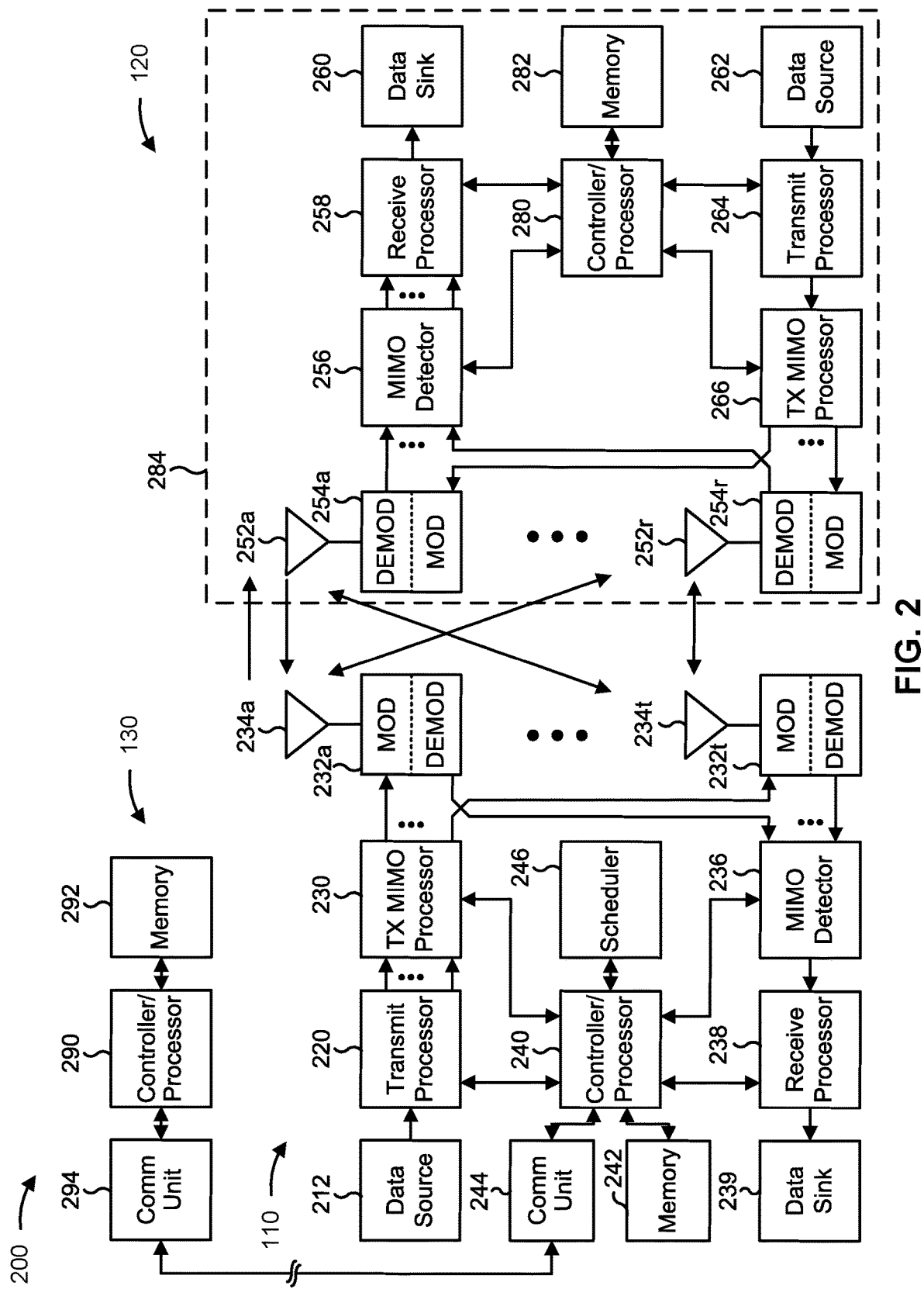
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through

254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with beam type information reporting for hierarchical beamforming in wireless communication, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2 For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions.

In some aspects, a first wireless communication device includes means for receiving, from a second wireless communication device, beam type information associated with at least one beam used by the second wireless communication device for a hierarchical beamforming process, wherein the beam type information includes an indication of a number of beam types used in the hierarchical beamforming process and an indication of a number of beams of each of the beam types used in the hierarchical beamforming process; or means for performing a wireless communication action based at least in part on the beam type information. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for transmitting, to the second wireless communication device, a beam type information reporting configuration that indicates the at least one beam type.

In some aspects, the first wireless communication device includes means for receiving, from a second wireless communication device, beam type information associated with at least one beam used by the second wireless communication device for a hierarchical beamforming process, wherein the beam type information includes an indication of a number of beam types used in the hierarchical beamforming process and at least one parameter associated with a relative array gain across beams corresponding to the beam types; or means for performing a wireless communication action based at least in part on the beam type information. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for transmitting, to the second wireless communication device, a beam type information reporting configuration that indicates the at least one beam type.

In some aspects, a first wireless communication device includes means for transmitting, to an additional wireless communication device, beam type information associated with at least one beam used by the first wireless communication device for a hierarchical beamforming process, wherein the beam type information includes an indication of a number of beam types used in the hierarchical beamforming process and an indication of a number of beams of each of the beam types used in the hierarchical beamforming process; or means for communicating on a wireless communication network based at least in part on the beam type information. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a first wireless communication device includes means for transmitting, to a second wireless communication device, beam type information associated with at least one beam used by the first wireless communication device for a hierarchical beamforming process, wherein the beam type information includes an indication of a number of beam types used in the hierarchical beamforming process and at least one parameter associated with a relative array gain across beams corresponding to the beam types; or means for communicating on a wireless communication network based at least in part on the beam type information. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
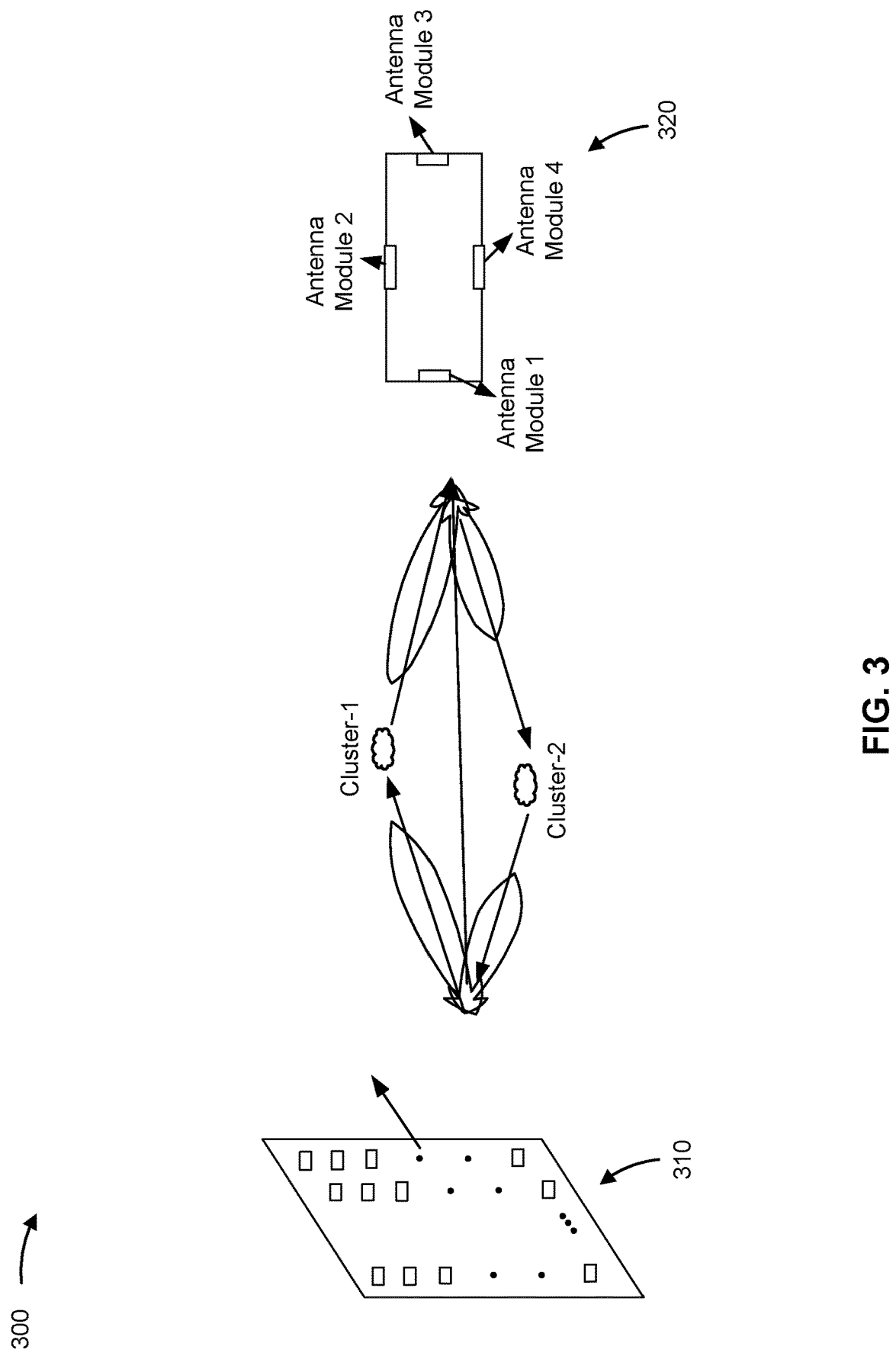
FIG. 3 is a diagram illustrating an example of wireless communication using beams, in accordance with various aspects of the present disclosure.

FIG. 3 is a diagram illustrating an example of wireless communication using beams, in accordance with various aspects of the present disclosure. As shown, a first antenna array 310 and a second antenna array 320 may communicate with one another. In some aspects, the first antenna array 310 may be associated with a wireless communication device such as, for example, a base station, and the second antenna array 320 may be associated with a wireless communication device such as, for example, a UE. The first antenna array 310 and the second antenna array 320 may communicate using a millimeter wave network.

As shown, the first antenna array 310 may include a large number of antenna elements. The second antenna array 320 may include a number of antenna modules (Antenna Module 1, Antenna Module 2, Antenna Module 3, Antenna Module 4), each having a different associated coverage area. As a result, the antenna array 310 and the antenna array 320 each may include a large number of antenna dimensions. Due to the large number of antenna dimensions and the sparsity of channels, a directional beamforming process over distinct clusters in the channels may be used, as shown.

To address overhead in this type of directional beamforming, a hierarchical beamforming method may be used. The hierarchical beamforming method may be specified by a wireless communication standard. In a first aspect (which may be referred to as "P-1") of the hierarchical beamforming process, a wide beam at the first antenna array 310, and a wide beam at the second antenna array 320 are used. In a second aspect (which may be referred to as "P-2"), a beam refinement is performed at the first antenna array 310 (e.g., at a base station), and in a third aspect (which may be referred to as "P-3"), a beam refinement is performed at the second antenna array 320 (e.g., at a UE). Different beam types may be used at each aspect P-1, P-2, and P-3 of the hierarchical beamforming process.

As indicated above, FIG. 3 is provided as an example. Other examples may differ from what is described with regard to FIG. 3.

Figure 4:
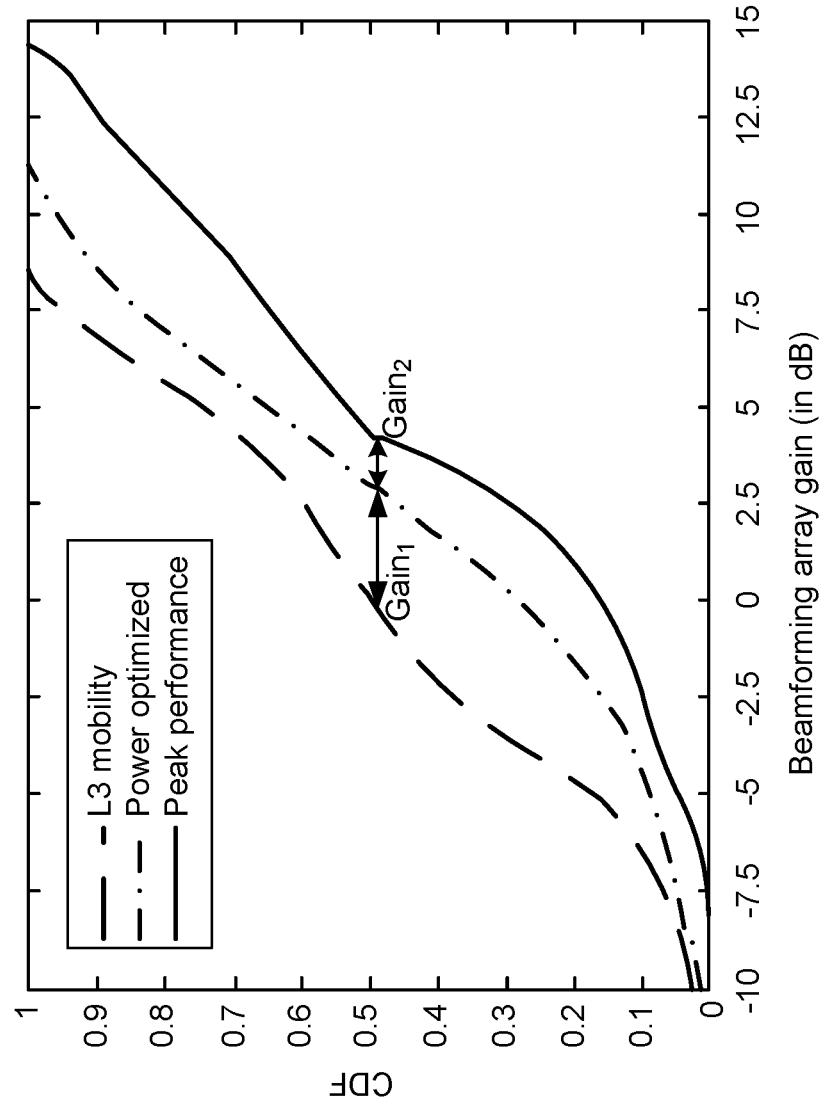
FIG. 4 is a diagram illustrating an example of a plot of beamforming gain over a sphere with three different types of beams, in accordance with various aspects of the present disclosure.

FIG. 4 is a diagram illustrating an example of a plot of beamforming gain over a sphere with three different types of beams, in accordance with various aspects of the present disclosure. As shown, cumulative distribution functions (CDFs) of a beamforming array gain for each of three different beam types are plotted.

In the illustrated example, a UE with a single antenna module at 60 GHz could have an 8×2 antenna array corresponding to a peak beamforming gain of approximately 14 dB, of which 2 dB corresponds to the peak elemental gain and 12 dB corresponds to array gain with the use of an 8×2 antenna array. The beamforming process may include a hybrid beamforming process performed in a hierarchical beamforming manner with different beam types used in each step of the hierarchy of the hierarchical beamforming.

One beam type that is illustrated may include beams that are used for layer 3 (L3) mobility (referred to as L3 mobility beams). L3 mobility beams may also be used to scan neighbor cells and/or for handover, among other examples. These types of constant overhead processes may incur significant power consumption, the reduction of which may lead to the use of smaller number of antenna elements with a lower beamforming gain. Another type of beam illustrated is a peak performance beam type. Peak performance beams may be used for peak performance or highest beamforming gain in connected mode operations. Often, peak performance beams use all antenna elements and consume the most power. An intermediate type of beams (which may be referred to as "power optimized" beams) may be intermediate between these L3 mobility beams and peak performance beams. Power optimized beams tradeoff power with performance by using a set of antenna elements more than that used with L3 mobility beams and less than that used with peak performance beams.

As shown by the plot in FIG. 4, the array gain may vary between these beam types and, thus, may have effects on various aspects of communications such as, for example, on scheduling, reliability, and/or signal strength, among other examples. Beamforming may involve weighting various beam types. However, in some cases, information about the beam types may not be reported from one device to another. As a result, devices may not be able to optimize the effects of beamforming by taking into account parameters impacted by beamforming. This may lead to network performance deteriorations and/or communication efficiency deteriorations.

Aspects of techniques and apparatuses described herein provide for reporting beam type information. For example, in some aspects, a first wireless communication device may report beam type information to a second wireless communication device. The beam type information may include information about the number of beam types used, the number of beams per beam type, and/or parameters associated with beam performance (e.g., relative array gain). The first wireless communication device may use the reported beam type information to facilitate performing a wireless communication action such as, for example, scheduling, establishing system communication parameters, and/or generating reference signals, among other examples. In this way, some aspects may lead to network performance and/or communication efficiency improvements.

As indicated above, FIG. 4 is provided as an example. Other examples may differ from what is described with regard to FIG. 4.

Figure 5:
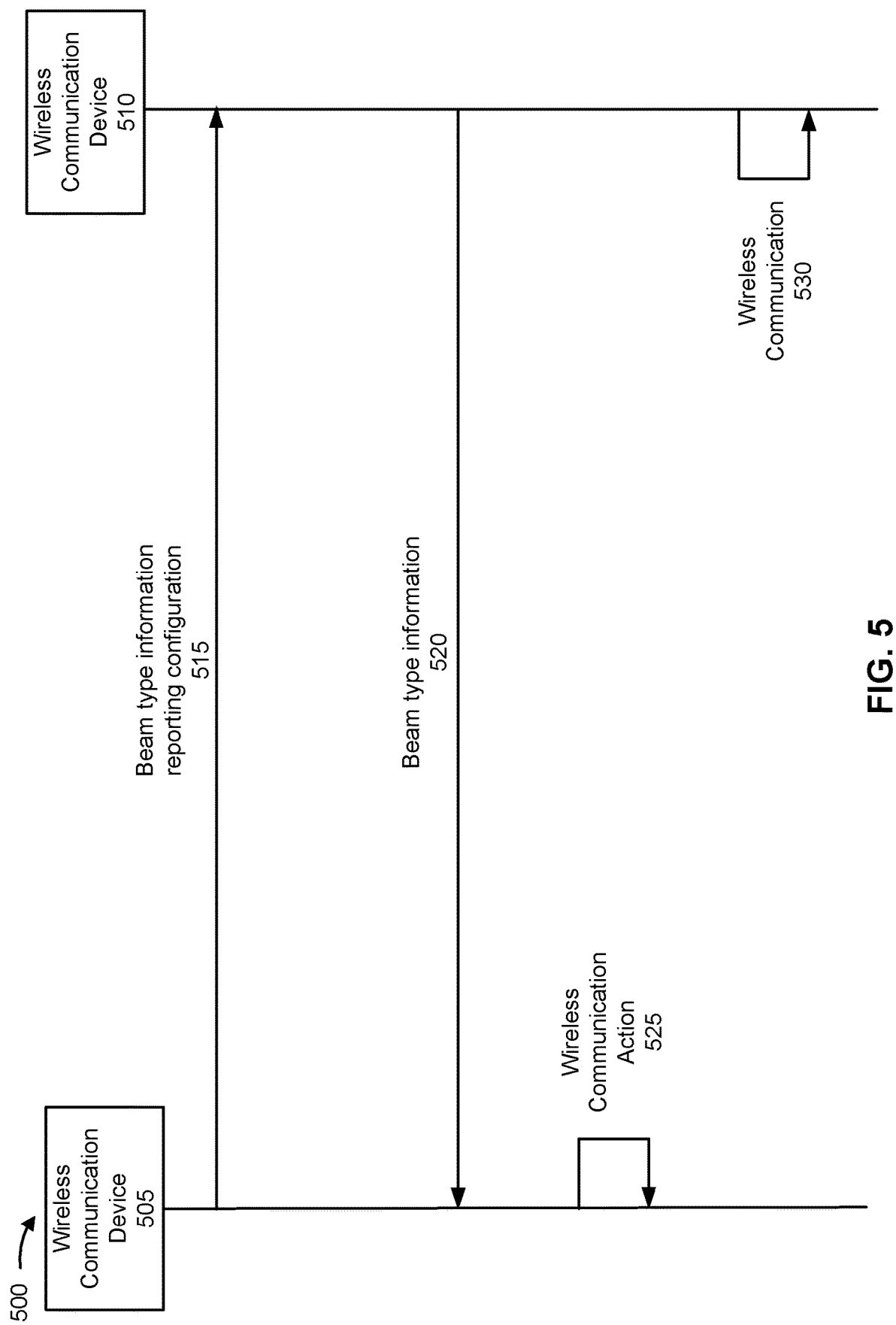
FIG. 5 is a diagram illustrating an example associated with beam type information reporting for hierarchical beamforming in wireless communication, in accordance with various aspects of the present disclosure.

FIG. 5 is a diagram illustrating an example associated with beam type information reporting for hierarchical beamforming in wireless communication, in accordance with various aspects of the present disclosure. As shown, a first wireless communication device 505 and a second wireless communication device 510 may communicate with one another. In some aspects, the wireless communication device 505 and/or the wireless communication device 510 may include a UE, a base station, a customer premises equipment (CPE), a sidelink node, a repeater (e.g., a smart repeater, an RF/a dumb repeater, etc.), an IAB node, and/or a transmission reception point, among other examples.

As shown by reference number 515, wireless communication device 505 may transmit, and the wireless communication device 510 may receive a beam type information reporting configuration. The beam type information reporting configuration may indicate types of information to report, at least one beam type about which to report information, a format for reporting information and/or reporting scheduling information, among other examples. For example, a number of beam types for which beam type information is to be reported may be configured.

Reporting scheduling information may include information about scheduling reporting events. For example, reporting scheduling information may indicate a periodic reporting configuration, a semi-persistent reporting configuration, dedicated resources for reporting beam type information, resource types for reporting beam type information, and/or conditions under which beam type information is to be reported.

As shown by reference number 520, the wireless communication device 510 may transmit, and the wireless communication device 505 may receive, beam type information. The beam type information may be associated with at least one beam used by the wireless communication device 510 for a hierarchical beamforming process. As indicated above, the hierarchical beamforming process may be a hierarchical beamforming process described in a wireless communication standard. For example, the beamforming process may include a hybrid beamforming process performed in a hierarchical beamforming manner with different beam types used in each step of the hierarchy of the hierarchical beamforming. In some aspects, the hierarchical beamforming process may be an analog beamforming process. The hierarchical beamforming process may be used for access link communications, IAB communications, and/or sidelink communications, among other examples.

In some aspects, the wireless communication device 510 may transmit the beam type information based at least in part on a determination of an activation of the wireless communication device 510. For example, the wireless communication device 510 may be configured (e.g., by the beam type configuration or other configuration process) to transmit the beam type information upon activation (start-up). The beam type information may be carried, for example, in a capability field. In some aspects, the wireless communication device 510 may be configured to transmit the beam type information based at least in part on establishing a connection with another device and/or a network.

In some aspects, the beam type information may be transmitted based at least in part on a determination of an updated beam type. For example, the wireless communication device 510 may determine that a beam type that the wireless communication device 510 was not already using should be used and may begin using the determined beam type. This may be an example of a beam type update and, based at least in part on determining the beam type update (e.g., determining to update the beam, determining that the beam type has been activated), the wireless communication device 510 may transmit beam type information.

In some aspects, the wireless communication device 510 may transmit beam type information to the wireless communication device 505 based at least in part on receiving a request for beam type information from the wireless communication device 505. The request may be part of the beam type information configuration. The request may be dynamic and may be transmitted to the wireless communication device 510 based at least in part on a determination that a communication link has degraded by a specified amount, that one of the devices has moved, and/or the like.

In some aspects, the beam type information may include an indication of a number of beam types used in the hierarchical beamforming process. The beam type information may include an indication of a number of beams of each of the beam types used in the hierarchical beamforming process. A total number of beams may be derived from this information and/or expressly indicated in the beam type information. In some aspects, beam types used and/or indicated may be based at least in part on an antenna array architecture of the wireless communication device 510. The beam types may include, for example, an L3 mobility beam type, a peak performance beam type, and/or a power optimized performance beam type, among other examples. In some aspects, the number of beams used per beam type may be any number and may depend on the antenna array architecture (e.g., array geometry, size, inter-antenna element spacing in azimuth and/or elevation, number of antenna modules, number of antenna panels, frequencies covered). The number of beams per beam type may vary between device types (e.g., UEs, base stations, CPEs, high mobility device, low mobility devices).

In some aspects, the beam type information may include at least one parameter associated with a relative array gain across beams corresponding to beam types. For example, the beam type information may include at least one parameter associated with a relative array gain corresponding to a first beam type, relative to a second beam type. In some aspects, the at least one parameter associated with the relative array gain may include an effective isotropic radiated power (EIRP) difference across the beams corresponding to the beam types.

In some aspects, the at least one parameter may include one or more statistics associated with array gain improvement (e.g., maximum, median, mean, $90^{th}$ percentile) from one beam type to another. In some aspects, the at least one parameter may be conveyed as corresponding to a relative number of antenna dimensions in azimuth and/or elevation used for each beam type or an effective number of antenna dimensions in azimuth and/or elevation used for each beam type. In other words, instead of capturing the array gain of one beam type relative to another beam type, the equivalent information may be conveyed in terms of the antenna dimension changes that could be associated with the array gain changes. For example, in some aspects, the beam type information may include an indication that the at least one parameter corresponds to at least one of: a relative number of antenna dimensions used for each beam type of a plurality of beam types, or an effective number of antenna dimensions used for each beam type of a plurality of beam types.

In some aspects, the beam type information may include an indication that the at least one parameter corresponds to at least one of an antenna panel, an antenna module, a coverage area of the antenna panel, or a coverage area of the antenna module. In some aspects, the beam type information may include an indication that the at least one parameter corresponds to a frequency range of coverage associated with the antenna module.

As shown by reference number 525, the wireless communication device 505 may perform a wireless communication action based at least in part on the beam type information. For example, in some aspects, the wireless communication action may include scheduling resources for the wireless communication device 510. Beam type information may be used to inform the scheduling decisions. For example, the wireless communication device 505 may be able to use beam type information to ascertain beamforming gains and/or predict interference (e.g., side or grating lobes) among other examples. In some aspects, the wireless communication action may include scheduling and/or transmitting reference signals. In some aspects, the wireless communication action may include establishing system parameters. The system parameters may include, for example, modulation and coding scheme (MCS), coding rate, and/or transmission power, among other examples.

As shown by reference number 530, the wireless communication device 510 may communicate on a wireless communication network based at least in part on the beam type information. In some aspects, the wireless communication device 510 may communicate with the wireless communication device 505. In some aspects, the wireless communication device 510 may communicate with another device not illustrated in FIG. 5.

As indicated above, FIG. 5 is provided as an example. Other examples may differ from what is described with regard to FIG. 5.

Figure 6:
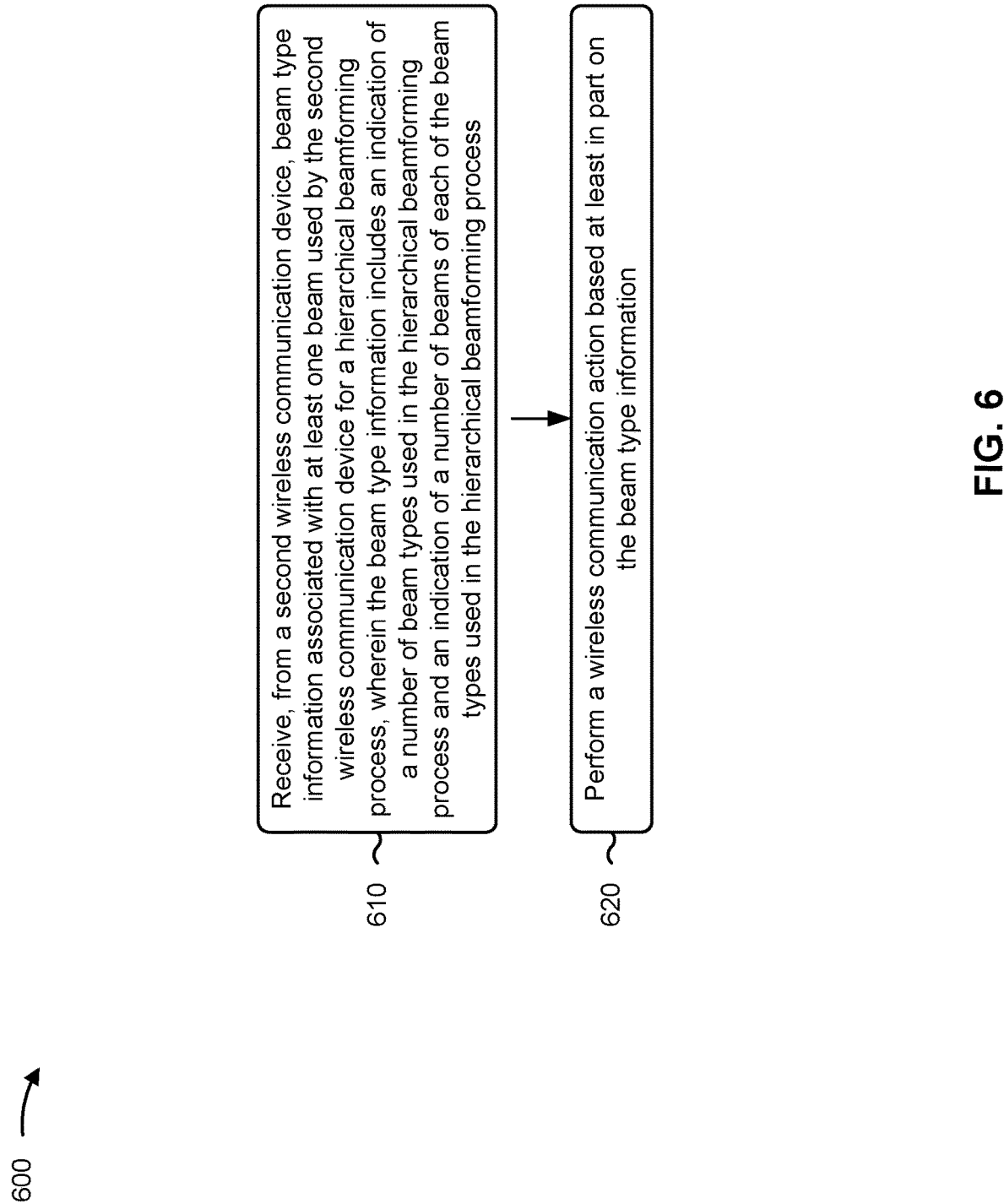
FIGS. 6-9 are diagrams illustrating example processes associated with beam type information reporting for hierarchical beamforming in wireless communication, in accordance with various aspects of the present disclosure.

FIG. 6 is a diagram illustrating an example process 600 performed, for example, by a first wireless communication device, in accordance with various aspects of the present disclosure. Example process 600 is an example where the first wireless communication device (e.g., wireless communication device 505 shown in FIG. 5) performs operations associated with beam type information reporting for hierarchical beamforming in wireless communication.

As shown in FIG. 6, in some aspects, process 600 may include receiving, from a second wireless communication device, beam type information associated with at least one beam used by the second wireless communication device for a hierarchical beamforming process, wherein the beam type information includes an indication of a number of beam types used in the hierarchical beamforming process and an indication of a number of beams of each of the beam types used in the hierarchical beamforming process (block 610). For example, the first wireless communication device (e.g., using reception component 1102, depicted in FIG. 11) may receive, from a second wireless communication device, beam type information associated with at least one beam used by the second wireless communication device for a hierarchical beamforming process, wherein the beam type information includes an indication of a number of beam types used in the hierarchical beamforming process and an indication of a number of beams of each of the beam types used in the hierarchical beamforming process, as described above.

As further shown in FIG. 6, in some aspects, process 600 may include performing a wireless communication action based at least in part on the beam type information (block 620). For example, the first wireless communication device (e.g., using reception component 1102 and/or transmission component 1104, depicted in FIG. 11) may perform a wireless communication action based at least in part on the beam type information, as described above.

Process 600 may include additional aspects, such as any single aspect or any combination of aspects described below and/or in connection with one or more other processes described elsewhere herein.

In a first aspect, the beam types are based at least in part on an antenna array architecture of the second wireless communication device.

In a second aspect, alone or in combination with the first aspect, the beam type information includes at least one parameter associated with relative array gain corresponding to a first beam type, relative to a second beam type.

In a third aspect, alone or in combination with one or more of the first and second aspects, the beam type information includes an indication that the at least one parameter corresponds to at least one of a relative number of antenna dimensions used for each beam type of a plurality of beam types, or an effective number of antenna dimensions used for each beam type of a plurality of beam types.

In a fourth aspect, alone or in combination with one or more of the first through third aspects, the beam type information includes an indication that the at least one parameter corresponds to at least one of an antenna panel, an antenna module, a coverage area of the antenna panel, or a coverage area of the antenna module.

In a fifth aspect, alone or in combination with one or more of the first through fourth aspects, the beam type information includes an indication that the at least one parameter corresponds to a frequency range of coverage associated with the antenna module.

In a sixth aspect, alone or in combination with one or more of the first through fifth aspects, process 600 includes transmitting, to the second wireless communication device, a beam type information reporting configuration that indicates the at least one beam type.

In a seventh aspect, alone or in combination with one or more of the first through sixth aspects, the beam type information reporting configuration further comprises reporting scheduling information.

In an eighth aspect, alone or in combination with one or more of the first through seventh aspects, reception of the beam type information comprises receiving the beam type information based at least in part on a determination of an activation of the second wireless communication device.

In a ninth aspect, alone or in combination with one or more of the first through eighth aspects, the beam type information is carried in a capability field.

In a tenth aspect, alone or in combination with one or more of the first through ninth aspects, reception of the beam type information comprises receiving the beam type information based at least in part on a determination of an updated beam type.

In an eleventh aspect, alone or in combination with one or more of the first through tenth aspects, the beamforming process comprises a hybrid beamforming process performed in a hierarchical beamforming manner with different beam types used in each step of the hierarchy of the hierarchical beamforming.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
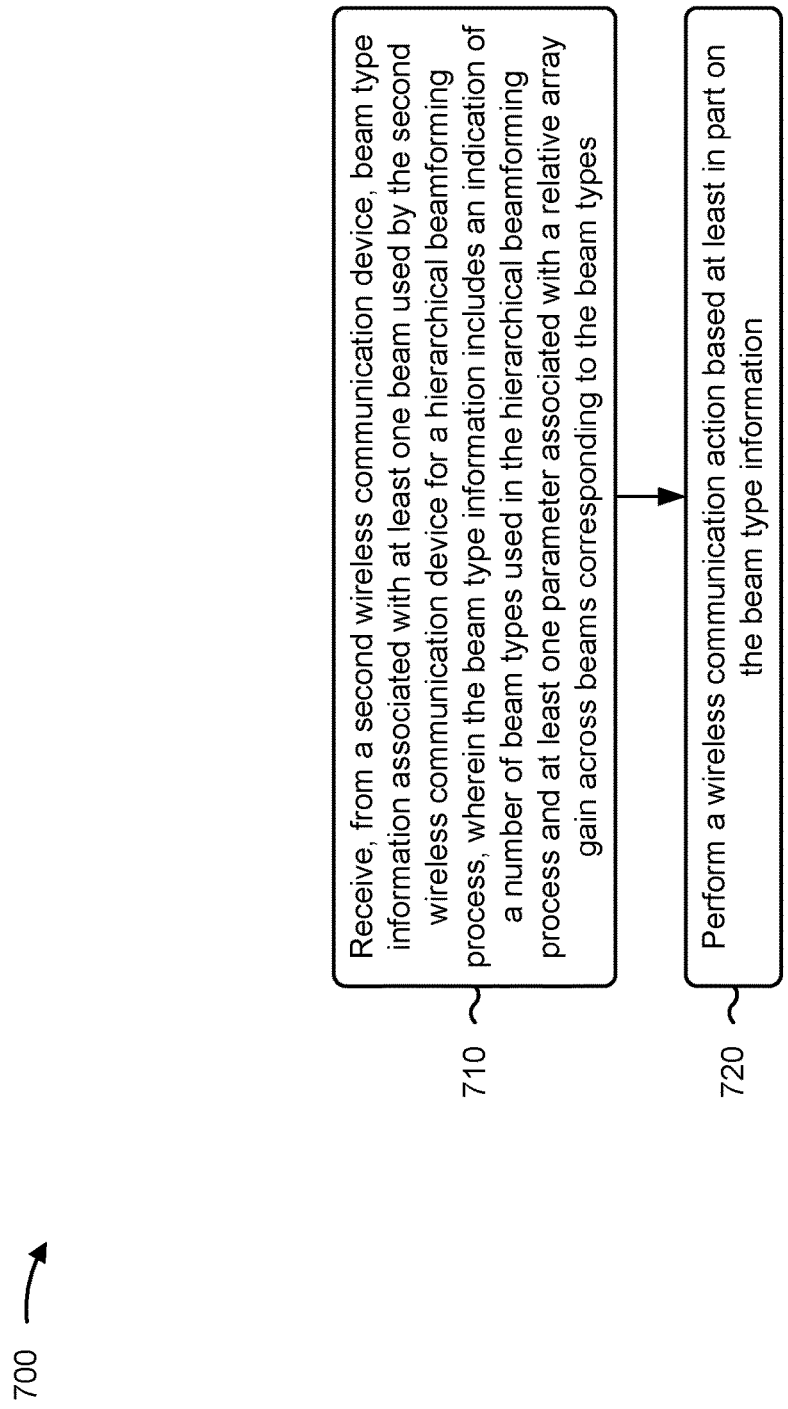

FIG. 7 is a diagram illustrating an example process 700 performed, for example, by a first wireless communication device, in accordance with various aspects of the present disclosure. Example process 700 is an example where the first wireless communication device (e.g., wireless communication device 505 shown in FIG. 5) performs operations associated with beam type information reporting for hierarchical beamforming in wireless communication.

As shown in FIG. 7, in some aspects, process 700 may include receiving, from a second wireless communication device, beam type information associated with at least one beam used by the second wireless communication device for a hierarchical beamforming process, wherein the beam type information includes an indication of a number of beam types used in the hierarchical beamforming process and at least one parameter associated with a relative array gain across beams corresponding to the beam types (block 710). For example, the first wireless communication device (e.g., using reception component 1102, depicted in FIG. 11) may receive, from a second wireless communication device, beam type information associated with at least one beam used by the additional wireless communication device for a hierarchical beamforming process, wherein the beam type information includes an indication of a number of beam types used in the hierarchical beamforming process and at least one parameter associated with a relative array gain across beams corresponding to the beam types, as described above.

As further shown in FIG. 7, in some aspects, process 700 may include performing a wireless communication action based at least in part on the beam type information (block 720). For example, the first wireless communication device (e.g., using reception component 1102 and/or transmission component 1104, depicted in FIG. 11) may perform a wireless communication action based at least in part on the beam type information, as described above.

Process 700 may include additional aspects, such as any single aspect or any combination of aspects described below and/or in connection with one or more other processes described elsewhere herein.

In a first aspect, the beam type information includes an indication of a number of beams of each of the beam types used in the hierarchical beamforming process.

In a second aspect, alone or in combination with the first aspect, the at least one parameter associated with the relative array gain comprises an effective isotropic radiated power difference across the beams corresponding to the beam types.

In a third aspect, alone or in combination with one or more of the first and second aspects, the beam types are based at least in part on an antenna array architecture of the first wireless communication device.

In a fourth aspect, alone or in combination with one or more of the first through third aspects, the beam type information includes an indication that the at least one parameter corresponds to at least one of a relative number of antenna dimensions used for each beam type of a plurality of beam types, or an effective number of antenna dimensions used for each beam type of a plurality of beam types.

In a fifth aspect, alone or in combination with one or more of the first through fourth aspects, the beam type information includes an indication that the at least one parameter corresponds to at least one of an antenna panel, an antenna module, a coverage area of the antenna panel, or a coverage area of the antenna module.

In a sixth aspect, alone or in combination with one or more of the first through fifth aspects, the beam type information includes an indication that the at least one parameter corresponds to a frequency range of coverage associated with the antenna module.

In a seventh aspect, alone or in combination with one or more of the first through sixth aspects, process 700 includes transmitting, to the second wireless communication device, a beam type information reporting configuration that indicates the at least one beam type.

In an eighth aspect, alone or in combination with one or more of the first through seventh aspects, the beam type information reporting configuration further comprises reporting scheduling information.

In a ninth aspect, alone or in combination with one or more of the first through eighth aspects, reception of the beam type information includes receiving the beam type information based at least in part on a determination of an activation of the second wireless communication device.

In a tenth aspect, alone or in combination with one or more of the first through ninth aspects, the beam type information is carried in a capability field.

In an eleventh aspect, alone or in combination with one or more of the first through tenth aspects, reception of the beam type information includes receiving the beam type information based at least in part on a determination of an updated beam type.

In a twelfth aspect, alone or in combination with one or more of the first through eleventh aspects, the beamforming process comprises a hybrid beamforming process performed in a hierarchical beamforming manner with different beam types used in each step of the hierarchy of the hierarchical beamforming.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
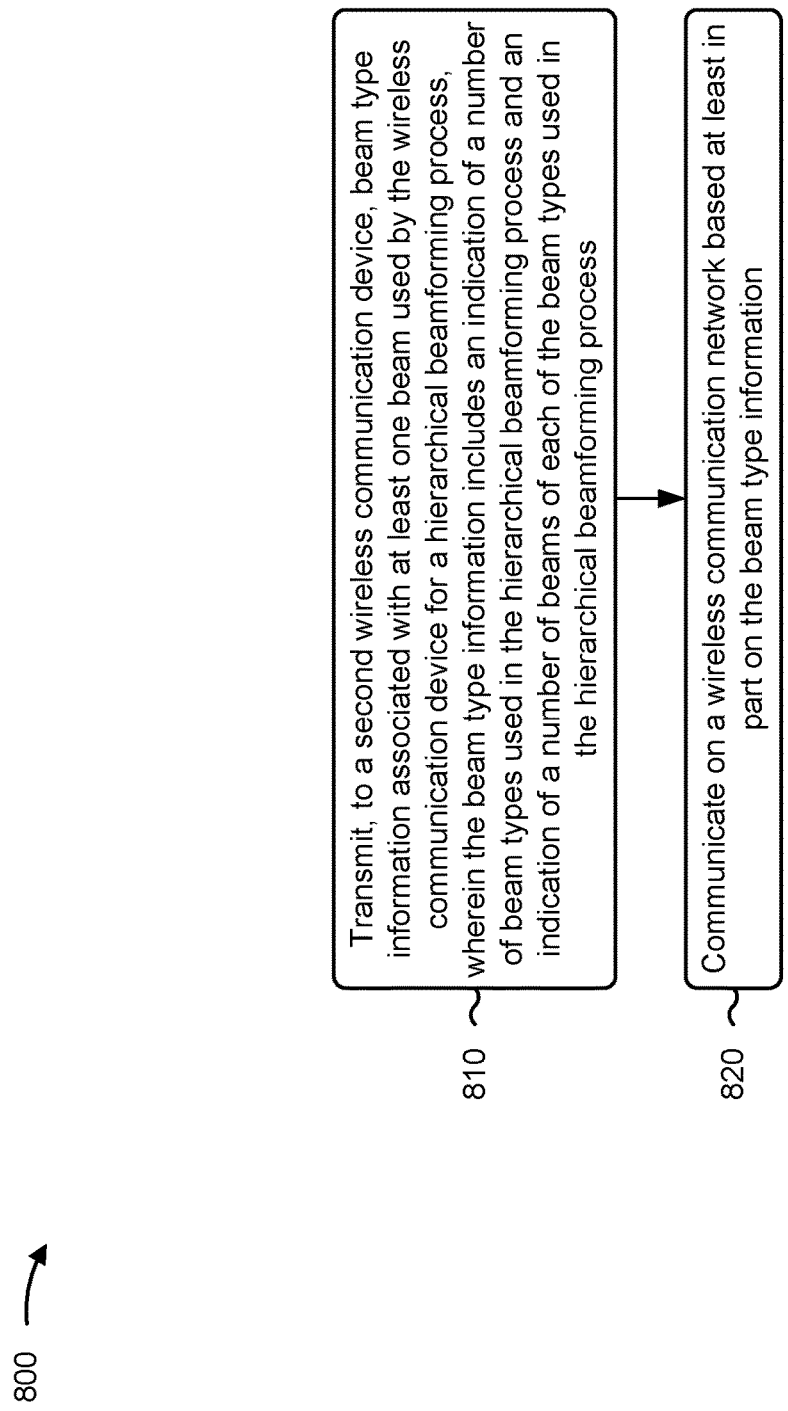

FIG. 8 is a diagram illustrating an example process 800 performed, for example, by a first wireless communication device, in accordance with various aspects of the present disclosure. Example process 800 is an example where the first wireless communication device (e.g., wireless communication device 510 shown in FIG. 5) performs operations associated with beam type information reporting for hierarchical beamforming in wireless communication.

As shown in FIG. 8, in some aspects, process 800 may include transmitting, to a second wireless communication device, beam type information associated with at least one beam used by the wireless communication device for a hierarchical beamforming process, wherein the beam type information includes an indication of a number of beam types used in the hierarchical beamforming process and an indication of a number of beams of each of the beam types used in the hierarchical beamforming process (block 810). For example, the first wireless communication device (e.g., using transmission component 1004, depicted in FIG. 10) may transmit, to a second wireless communication device, beam type information associated with at least one beam used by the first wireless communication device for a hierarchical beamforming process, wherein the beam type information includes an indication of a number of beam types used in the hierarchical beamforming process and an indication of a number of beams of each of the beam types used in the hierarchical beamforming process, as described above.

As further shown in FIG. 8, in some aspects, process 800 may include communicating on a wireless communication network based at least in part on the beam type information (block 820). For example, the first wireless communication device (e.g., using reception component 1002 and/or transmission component 1004, depicted in FIG. 10) may communicate on a wireless communication network based at least in part on the beam type information, as described above.

Process 800 may include additional aspects, such as any single aspect or any combination of aspects described below and/or in connection with one or more other processes described elsewhere herein.

In a first aspect, the beam types are based at least in part on an antenna array architecture of the first wireless communication device.

In a second aspect, alone or in combination with the first aspect, the beam type information includes at least one parameter associated with relative array gain corresponding to a first beam type, relative to a second beam type.

In a third aspect, alone or in combination with one or more of the first and second aspects, the beam type information includes an indication that the at least one parameter corresponds to at least one of a relative number of antenna dimensions used for each beam type of a plurality of beam types, or an effective number of antenna dimensions used for each beam type of a plurality of beam types.

In a fourth aspect, alone or in combination with one or more of the first through third aspects, the beam type information includes an indication that the at least one parameter corresponds to at least one of an antenna panel, an antenna module, a coverage area of the antenna panel, or a coverage area of the antenna module.

In a fifth aspect, alone or in combination with one or more of the first through fourth aspects, the beam type information includes an indication that the at least one parameter corresponds to a frequency range of coverage associated with the antenna module.

In a sixth aspect, alone or in combination with one or more of the first through fifth aspects, process 800 includes receiving, from the second wireless communication device, a beam type information reporting configuration that indicates the at least one beam type.

In a seventh aspect, alone or in combination with one or more of the first through sixth aspects, the beam type information reporting configuration further comprises reporting scheduling information.

In an eighth aspect, alone or in combination with one or more of the first through seventh aspects, reception of the beam type information comprises receiving the beam type information based at least in part on a determination of an activation of the wireless communication device.

In a ninth aspect, alone or in combination with one or more of the first through eighth aspects, the beam type information is carried in a capability field.

In a tenth aspect, alone or in combination with one or more of the first through ninth aspects, transmission of the beam type information comprises transmitting the beam type information based at least in part on a determination of an updated beam type.

In an eleventh aspect, alone or in combination with one or more of the first through tenth aspects, the beamforming process comprises a hybrid beamforming process performed in a hierarchical beamforming manner with different beam types used in each step of the hierarchy of the hierarchical beamforming.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
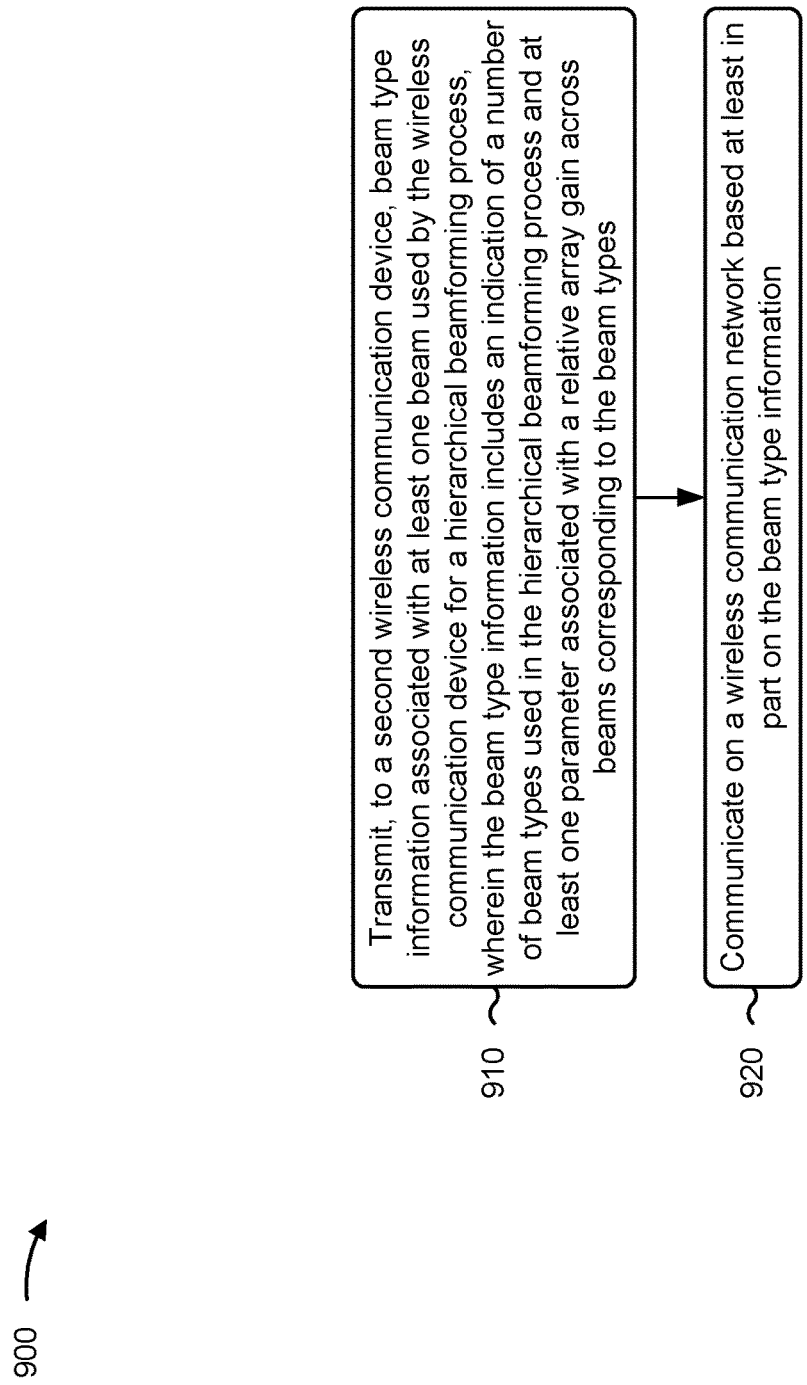

FIG. 9 is a diagram illustrating an example process 900 performed, for example, by a first wireless communication device, in accordance with various aspects of the present disclosure. Example process 900 is an example where the first wireless communication device (e.g., wireless communication device 510 shown in FIG. 5) performs operations associated with beam type information reporting for hierarchical beamforming in wireless communication.

As shown in FIG. 9, in some aspects, process 900 may include transmitting, to a second wireless communication device, beam type information associated with at least one beam used by the first wireless communication device for a hierarchical beamforming process, wherein the beam type information includes an indication of a number of beam types used in the hierarchical beamforming process and at least one parameter associated with a relative array gain across beams corresponding to the beam types (block 910). For example, the first wireless communication device (e.g., using transmission component 1004, depicted in FIG. 10) may transmit, to a second wireless communication device, beam type information associated with at least one beam used by the first wireless communication device for a hierarchical beamforming process, wherein the beam type information includes an indication of a number of beam types used in the hierarchical beamforming process and at least one parameter associated with a relative array gain across beams corresponding to the beam types, as described above.

As further shown in FIG. 9, in some aspects, process 900 may include communicating on a wireless communication network based at least in part on the beam type information (block 920). For example, the first wireless communication device (e.g., using reception component 1002 and/or transmission component 1004, depicted in FIG. 10) may communicate on a wireless communication network based at least in part on the beam type information, as described above.

Process 900 may include additional aspects, such as any single aspect or any combination of aspects described below and/or in connection with one or more other processes described elsewhere herein.

In a first aspect, the beam type information includes an indication of a number of beams of each of the beam types used in the hierarchical beamforming process.

In a second aspect, alone or in combination with the first aspect, the at least one parameter associated with the relative array gain comprises an effective isotropic radiated power difference across the beams corresponding to the beam types.

In a third aspect, alone or in combination with one or more of the first and second aspects, the beam types are based at least in part on an antenna array architecture of the first wireless communication device.

In a fourth aspect, alone or in combination with one or more of the first through third aspects, the beam type information includes an indication that the at least one parameter corresponds to at least one of a relative number of antenna dimensions used for each beam type of a plurality of beam types, or an effective number of antenna dimensions used for each beam type of a plurality of beam types.

In a fifth aspect, alone or in combination with one or more of the first through fourth aspects, the beam type information includes an indication that the at least one parameter corresponds to at least one of an antenna panel, an antenna module, a coverage area of the antenna panel, or a coverage area of the antenna module.

In a sixth aspect, alone or in combination with one or more of the first through fifth aspects, the beam type information includes an indication that the at least one parameter corresponds to a frequency range of coverage associated with the antenna module.

In a seventh aspect, alone or in combination with one or more of the first through sixth aspects, process 900 includes receiving, from the second wireless communication device, a beam type information reporting configuration that indicates the at least one beam type.

In an eighth aspect, alone or in combination with one or more of the first through seventh aspects, the beam type information reporting configuration further comprises reporting scheduling information.

In a ninth aspect, alone or in combination with one or more of the first through eighth aspects, transmission of the beam type information comprises transmitting the beam type information based at least in part on a determination of an activation of the first wireless communication device.

In a tenth aspect, alone or in combination with one or more of the first through ninth aspects, the beam type information is carried in a capability field.

In an eleventh aspect, alone or in combination with one or more of the first through tenth aspects, reception of the beam type information includes receiving the beam type information based at least in part on a determination of an updated beam type.

In a twelfth aspect, alone or in combination with one or more of the first through eleventh aspects, the beamforming process includes a hybrid beamforming process performed in a hierarchical beamforming manner with different beam types used in each step of the hierarchy of the hierarchical beamforming.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
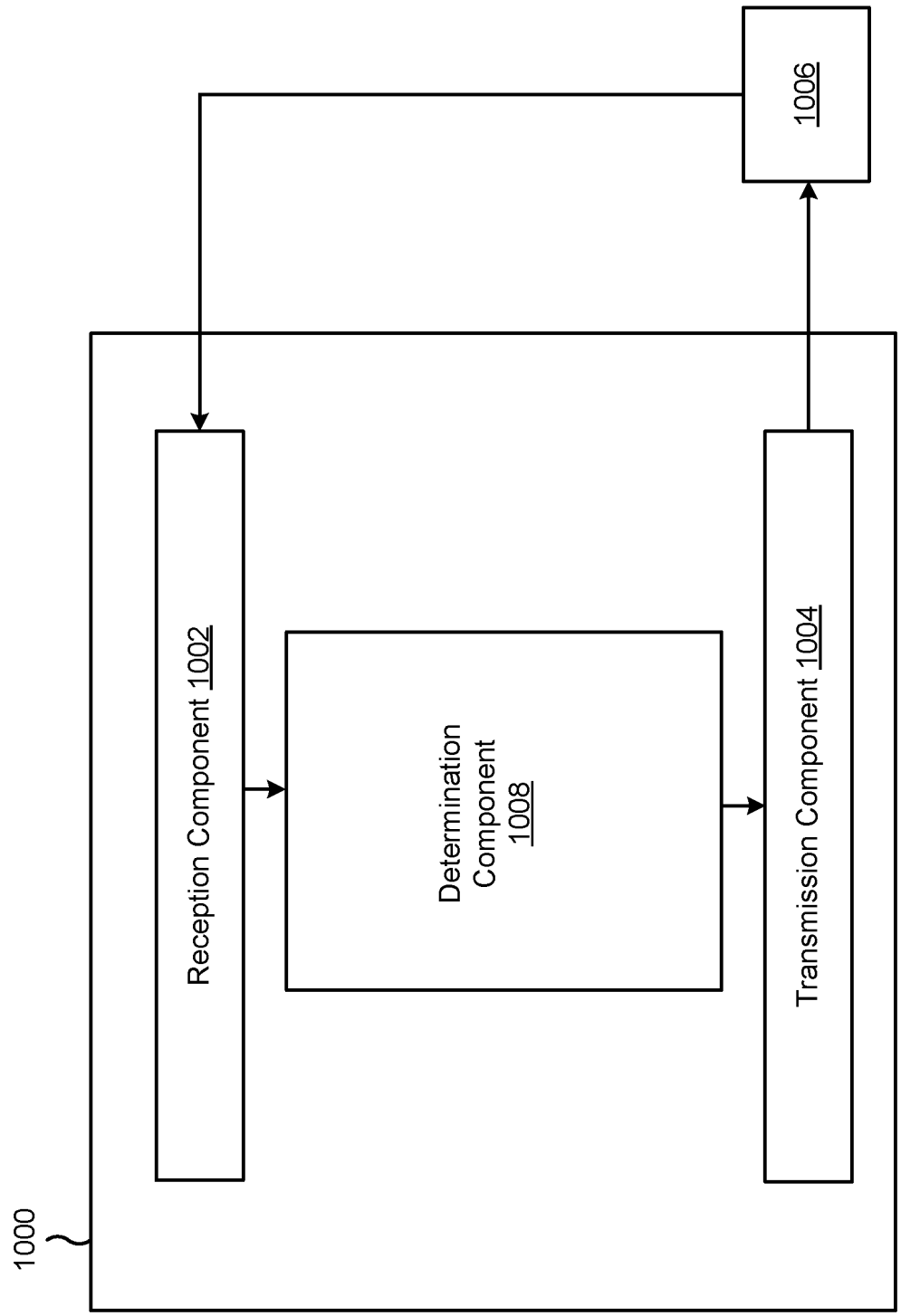
FIGS. 10 and 11 are block diagrams of example apparatuses for wireless communication, in accordance with various aspects of the present disclosure.

FIG. 10 is a block diagram of an example apparatus 1000 for wireless communication. The apparatus 1000 may be a wireless communication device such as a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008.

In some aspects, the apparatus 1000 may be configured to perform one or more operations described herein in connection with FIG. 5. Additionally, or alternatively, the apparatus 1000 may be configured to perform one or more processes described herein, such as process 600 of FIG. 6, process 700 of FIG. 7, process 800 of FIG. 8, process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The transmission component 1004 (of a first wireless communication device) may transmit, to a second wireless communication device, beam type information associated with at least one beam used by the first wireless communication device for a hierarchical beamforming process, wherein the beam type information includes an indication of a number of beam types used in the hierarchical beamforming process and an indication of a number of beams of each of the beam types used in the hierarchical beamforming process. The reception component 1002 and/or transmission component 1004 may communicate on a wireless communication network based at least in part on the beam type information.

The determination component 1008 may perform beamforming based at least in part on the beam type information. In some aspects, the determination component 1008 may include one or more antennas, a modulator, a transmit MIMO processor, a transmit processor, a controller/processor, a memory, or a combination thereof, of the UE described above in connection with FIG. 2. In some aspects, the determination component 1008 may include the reception component 1002 and/or transmission component 1004.

The transmission component 1004 may transmit, to the second wireless communication device, beam type information associated with at least one beam used by the first wireless communication device for a hierarchical beamforming process, wherein the beam type information includes an indication of a number of beam types used in the hierarchical beamforming process and at least one parameter associated with a relative array gain across beams corresponding to the beam types. The reception component 1002 and/or transmission component 1004 may communicate on a wireless communication network based at least in part on the beam type information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
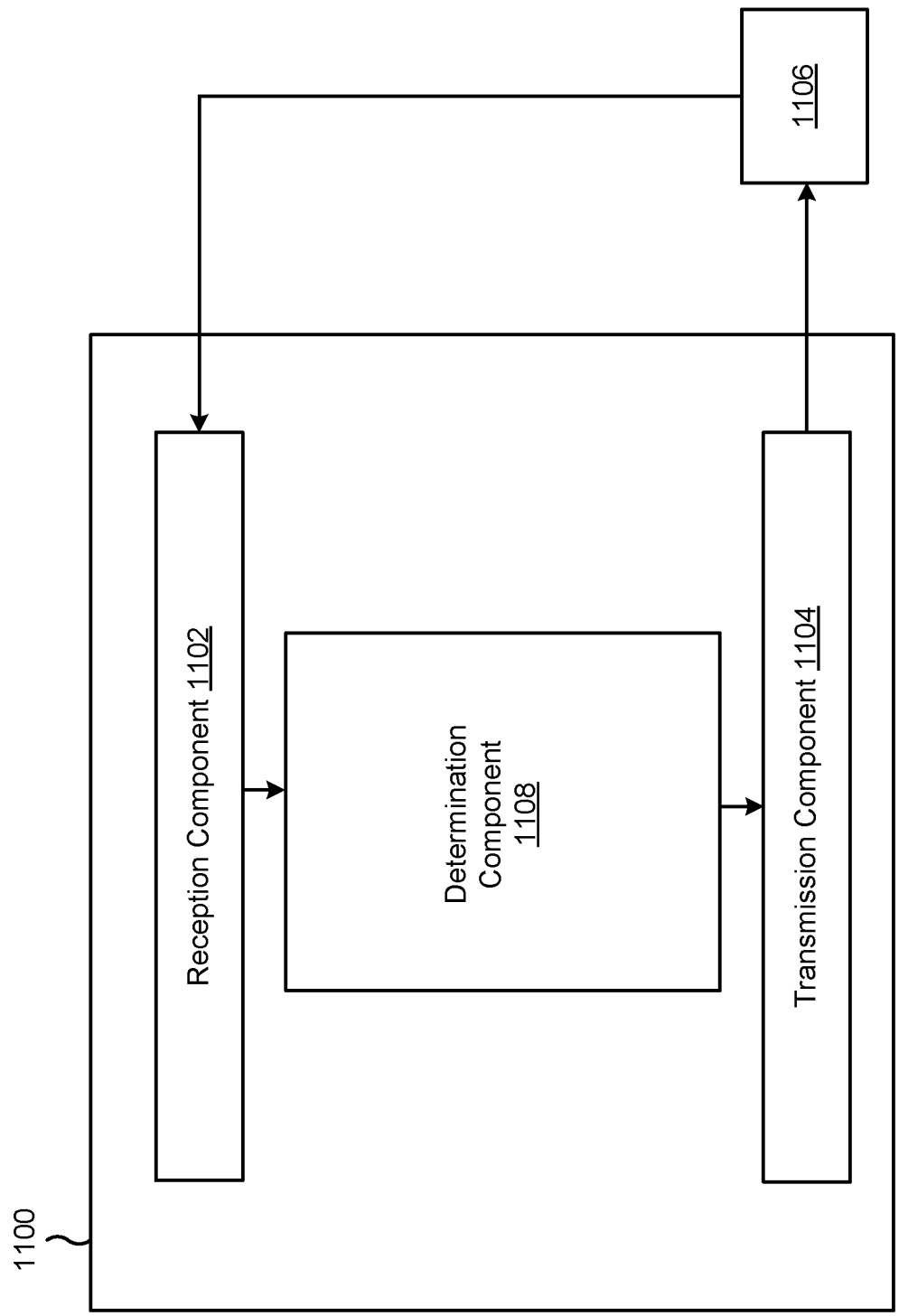

FIG. 11 is a block diagram of an example apparatus 1100 for wireless communication. The apparatus 1100 may be a wireless communication device such as a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108.

In some aspects, the apparatus 1100 may be configured to perform one or more operations described herein in connection with FIG. 5. Additionally, or alternatively, the apparatus 1100 may be configured to perform one or more processes described herein, such as process 600 of FIG. 6, process 700 of FIG. 7, process 800 of FIG. 8, process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 (e.g., of a first wireless communication device) may receive, from a second wireless communication device, beam type information associated with at least one beam used by the second wireless communication device for a hierarchical beamforming process, wherein the beam type information includes an indication of a number of beam types used in the hierarchical beamforming process and an indication of a number of beams of each of the beam types used in the hierarchical beamforming process. The reception component 1102 and/or transmission component 1104 may perform a wireless communication action based at least in part on the beam type information.

The transmission component 1104 may transmit, to the second wireless communication device, a beam type information reporting configuration that indicates the at least one beam type.

The determination component 1108 may determine a beam type to use and/or perform a hierarchical beamforming process. In some aspects, the determination component 1108 may include one or more antennas, a modulator, a transmit MIMO processor, a transmit processor, a controller/processor, a memory, or a combination thereof, of the base station described above in connection with FIG. 2. In some aspects, the determination component 1108 may include the reception component 1102 and/or transmission component 1104.

The reception component 1102 may receive, from the second wireless communication device, beam type information associated with at least one beam used by the second wireless communication device for a hierarchical beamforming process, wherein the beam type information includes an indication of a number of beam types used in the hierarchical beamforming process and at least one parameter associated with a relative array gain across beams corresponding to the beam types. The reception component 1102 and/or transmission component 1104 may perform a wireless communication action based at least in part on the beam type information.

The transmission component 1104 may transmit, to the second wireless communication device, a beam type information reporting configuration that indicates the at least one beam type.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a first wireless communication device, comprising: receiving, from a second wireless communication device, beam type information associated with at least one beam used by the second wireless communication device for a hierarchical beamforming process, wherein the beam type information includes an indication of a number of beam types used in the hierarchical beamforming process and an indication of a number of beams of each of the beam types used in the hierarchical beamforming process; and performing a wireless communication action based at least in part on the beam type information.

Aspect 2: The method of aspect 1, wherein the beam types are based at least in part on an antenna array architecture of the second wireless communication device.

Aspect 3: The method of either of aspects 1 or 2, wherein the beam type information includes at least one parameter associated with relative array gain corresponding to a first beam type, relative to a second beam type.

Aspect 4: The method of aspect 3, wherein the beam type information includes an indication that the at least one parameter corresponds to at least one of: a relative number of antenna dimensions used for each beam type of a plurality of beam types, or an effective number of antenna dimensions used for each beam type of a plurality of beam types.

Aspect 5: The method of either of aspects 3 or 4, wherein the beam type information includes an indication that the at least one parameter corresponds to at least one of: an antenna panel, an antenna module, a coverage area of the antenna panel, or a coverage area of the antenna module.

Aspect 6: The method of aspect 5, wherein the beam type information includes an indication that the at least one parameter corresponds to a frequency range of coverage associated with the antenna module.

Aspect 7: The method of any of aspects 1-6, further comprising transmitting, to the second wireless communication device, a beam type information reporting configuration that indicates the at least one beam type.

Aspect 8: The method of aspect 7, wherein the beam type information reporting configuration further comprises reporting scheduling information.

Aspect 9: The method of any of aspects 1-8, wherein reception of the beam type information comprises receiving the beam type information based at least in part on a determination of an activation of the second wireless communication device.

Aspect 10: The method of any of aspects 1-9, wherein the beam type information is carried in a capability field.

Aspect 11: The method of any of aspects 1-10, wherein reception of the beam type information comprises receiving the beam type information based at least in part on a determination of an updated beam type.

Aspect 12: The method of any of aspects 1-11, wherein the beamforming process comprises a hybrid beamforming process performed in a hierarchical beamforming manner with different beam types used in each step of the hierarchy of the hierarchical beamforming.

Aspect 13: A method of wireless communication performed by a first wireless communication device, comprising: receiving, from a second wireless communication device, beam type information associated with at least one beam used by the second wireless communication device for a hierarchical beamforming process, wherein the beam type information includes an indication of a number of beam types used in the hierarchical beamforming process and at least one parameter associated with a relative array gain across beams corresponding to the beam types; and performing a wireless communication action based at least in part on the beam type information.

Aspect 14: The method of aspect 13, wherein the beam type information includes an indication of a number of beams of each of the beam types used in the hierarchical beamforming process.

Aspect 15: The method of either of aspects 13 or 14, wherein the at least one parameter associated with the relative array gain comprises an effective isotropic radiated power difference across the beams corresponding to the beam types.

Aspect 16: The method of any of aspects 13-15, wherein the beam types are based at least in part on an antenna array architecture of the second wireless communication device.

Aspect 17: The method of any of aspects 13-16, wherein the beam type information includes an indication that the at least one parameter corresponds to at least one of: a relative number of antenna dimensions used for each beam type of a plurality of beam types, or an effective number of antenna dimensions used for each beam type of a plurality of beam types.

Aspect 18: The method of any of aspects 13-18, wherein the beam type information includes an indication that the at least one parameter corresponds to at least one of: an antenna panel, an antenna module, a coverage area of the antenna panel, or a coverage area of the antenna module.

Aspect 19: The method of aspect 18, wherein the beam type information includes an indication that the at least one parameter corresponds to a frequency range of coverage associated with the antenna module.

Aspect 20: The method of any of aspects 13-19, further comprising transmitting, to the second wireless communication device, a beam type information reporting configuration that indicates the at least one beam type.

Aspect 21: The method of aspect 20, wherein the beam type information reporting configuration further comprises reporting scheduling information.

Aspect 22: The method of any of aspects 13-21, wherein reception of the beam type information comprises receiving the beam type information based at least in part on a determination of an activation of the second wireless communication device.

Aspect 23: The method of any of aspects 13-22, wherein the beam type information is carried in a capability field.

Aspect 24: The method of any of aspects 13-23, wherein reception of the beam type information includes receiving the beam type information based at least in part on a determination of an updated beam type.

Aspect 25: The method of any of aspects 13-24, wherein the beamforming process comprises a hybrid beamforming process performed in a hierarchical beamforming manner with different beam types used in each step of the hierarchy of the hierarchical beamforming.

Aspect 26: A method of wireless communication performed by a first wireless communication device, comprising: transmitting, to a second wireless communication device, beam type information associated with at least one beam used by the first wireless communication device for a hierarchical beamforming process, wherein the beam type information includes an indication of a number of beam types used in the hierarchical beamforming process and an indication of a number of beams of each of the beam types used in the hierarchical beamforming process; and communicating on a wireless communication network based at least in part on the beam type information.

Aspect 27: The method of aspect 26, wherein the beam types are based at least in part on an antenna array architecture of the first wireless communication device.

Aspect 28: The method of either of aspects 26 or 27, wherein the beam type information includes at least one parameter associated with relative array gain corresponding to a first beam type, relative to a second beam type.

Aspect 29: The method of aspect 28, wherein the beam type information includes an indication that the at least one parameter corresponds to at least one of: a relative number of antenna dimensions used for each beam type of a plurality of beam types, or an effective number of antenna dimensions used for each beam type of a plurality of beam types.

Aspect 30: The method of either of aspects 28 or 29, wherein the beam type information includes an indication that the at least one parameter corresponds to at least one of: an antenna panel, an antenna module, a coverage area of the antenna panel, or a coverage area of the antenna module.

Aspect 31: The method of aspect 30, wherein the beam type information includes an indication that the at least one parameter corresponds to a frequency range of coverage associated with the antenna module.

Aspect 32: The method of any of aspects 26-31, further comprising receiving, from the second wireless communication device, a beam type information reporting configuration that indicates the at least one beam type.

Aspect 33: The method of aspect 32, wherein the beam type information reporting configuration further comprises reporting scheduling information.

Aspect 34: The method of any of aspects 26-33, wherein reception of the beam type information comprises receiving the beam type information based at least in part on a determination of an activation of the first wireless communication device.

Aspect 35: The method of any of aspects 26-34, wherein the beam type information is carried in a capability field.

Aspect 36: The method of any of aspects 26-35, wherein transmission of the beam type information comprises transmitting the beam type information based at least in part on a determination of an updated beam type.

Aspect 37: The method of any of aspects 26-36, wherein the beamforming process comprises a hybrid beamforming process performed in a hierarchical beamforming manner with different beam types used in each step of the hierarchy of the hierarchical beamforming.

Aspect 38: A method of wireless communication performed by a first wireless communication device, comprising: transmitting, to a second wireless communication device, beam type information associated with at least one beam used by the first wireless communication device for a hierarchical beamforming process, wherein the beam type information includes an indication of a number of beam types used in the hierarchical beamforming process and at least one parameter associated with a relative array gain across beams corresponding to the beam types; and communicating on a wireless communication network based at least in part on the beam type information.

Aspect 39: The method of aspect 38, wherein the beam type information includes an indication of a number of beams of each of the beam types used in the hierarchical beamforming process.

Aspect 40: The method of either of aspects 38 or 39, wherein the at least one parameter associated with the relative array gain comprises an effective isotropic radiated power difference across the beams corresponding to the beam types.

Aspect 41: The method of any of aspects 38-40, wherein the beam types are based at least in part on an antenna array architecture of the first wireless communication device.

Aspect 42: The method of any of aspects 38-41, wherein the beam type information includes an indication that the at least one parameter corresponds to at least one of: a relative number of antenna dimensions used for each beam type of a plurality of beam types, or an effective number of antenna dimensions used for each beam type of a plurality of beam types.

Aspect 43: The method of any of aspects 38-42, wherein the beam type information includes an indication that the at least one parameter corresponds to at least one of: an antenna panel, an antenna module, a coverage area of the antenna panel, or a coverage area of the antenna module.

Aspect 44: The method of aspect 43, wherein the beam type information includes an indication that the at least one parameter corresponds to a frequency range of coverage associated with the antenna module.

Aspect 45: The method of any of aspects 38-44, further comprising receiving, from the second wireless communication device, a beam type information reporting configuration that indicates the at least one beam type.

Aspect 46: The method of aspect 45, wherein the beam type information reporting configuration further comprises reporting scheduling information.

Aspect 47: The method of any of aspects 38-45, wherein transmission of the beam type information comprises transmitting the beam type information based at least in part on a determination of an activation of the first wireless communication device.

Aspect 48: The method of any of aspects 38-47, wherein the beam type information is carried in a capability field.

Aspect 49: The method of any of aspects 38-48, wherein reception of the beam type information comprises receiving the beam type information based at least in part on a determination of an updated beam type.

Aspect 50: The method of any of aspects 38-49, wherein the beamforming process comprises a hybrid beamforming process performed in a hierarchical beamforming manner with different beam types used in each step of the hierarchy of the hierarchical beamforming.

Aspect 51: An apparatus for wireless communication at a device, comprising a processor; memory coupled with the processor; and instructions stored in the memory and executable by the processor to cause the apparatus to perform the method of one or more aspects of aspects 1-12.

Aspect 52: A device for wireless communication, comprising a memory and one or more processors coupled to the memory, the memory and the one or more processors configured to perform the method of one or more aspects of aspects 1-12.

Aspect 53: An apparatus for wireless communication, comprising at least one means for performing the method of one or more aspects of aspects 1-12.

Aspect 54: A non-transitory computer-readable medium storing code for wireless communication, the code comprising instructions executable by a processor to perform the method of one or more aspects of aspects 1-12.

Aspect 55: A non-transitory computer-readable medium storing a set of instructions for wireless communication, the set of instructions comprising one or more instructions that, when executed by one or more processors of a device, cause the device to perform the method of one or more aspects of aspects 1-12.

Aspect 56: An apparatus for wireless communication at a device, comprising a processor; memory coupled with the processor; and instructions stored in the memory and executable by the processor to cause the apparatus to perform the method of one or more aspects of aspects 13-25.

Aspect 57: A device for wireless communication, comprising a memory and one or more processors coupled to the memory, the memory and the one or more processors configured to perform the method of one or more aspects of aspects 13-25.

Aspect 58: An apparatus for wireless communication, comprising at least one means for performing the method of one or more aspects of aspects 13-25.

Aspect 59: A non-transitory computer-readable medium storing code for wireless communication, the code comprising instructions executable by a processor to perform the method of one or more aspects of aspects 13-25.

Aspect 60: A non-transitory computer-readable medium storing a set of instructions for wireless communication, the set of instructions comprising one or more instructions that, when executed by one or more processors of a device, cause the device to perform the method of one or more aspects of aspects 13-25.

Aspect 61: An apparatus for wireless communication at a device, comprising a processor; memory coupled with the processor; and instructions stored in the memory and executable by the processor to cause the apparatus to perform the method of one or more aspects of aspects 26-37.

Aspect 62: A device for wireless communication, comprising a memory and one or more processors coupled to the memory, the memory and the one or more processors configured to perform the method of one or more aspects of aspects 26-37.

Aspect 63: An apparatus for wireless communication, comprising at least one means for performing the method of one or more aspects of aspects 26-37.

Aspect 64: A non-transitory computer-readable medium storing code for wireless communication, the code comprising instructions executable by a processor to perform the method of one or more aspects of aspects 26-37.

Aspect 65: A non-transitory computer-readable medium storing a set of instructions for wireless communication, the set of instructions comprising one or more instructions that, when executed by one or more processors of a device, cause the device to perform the method of one or more aspects of aspects 26-37.

Aspect 66: An apparatus for wireless communication at a device, comprising a processor; memory coupled with the processor; and instructions stored in the memory and executable by the processor to cause the apparatus to perform the method of one or more aspects of aspects 38-50.

Aspect 67: A device for wireless communication, comprising a memory and one or more processors coupled to the memory, the memory and the one or more processors configured to perform the method of one or more aspects of aspects 38-50.

Aspect 68: An apparatus for wireless communication, comprising at least one means for performing the method of one or more aspects of aspects 38-50.

Aspect 69: A non-transitory computer-readable medium storing code for wireless communication, the code comprising instructions executable by a processor to perform the method of one or more aspects of aspects 38-50.

Aspect 70: A non-transitory computer-readable medium storing a set of instructions for wireless communication, the set of instructions comprising one or more instructions that, when executed by one or more processors of a device, cause the device to perform the method of one or more aspects of aspects 38-50.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first wireless communication device, comprising:
   receiving, from a second wireless communication device, beam type information associated with at least one beam used by the second wireless communication device for a hierarchical beamforming process, wherein the beam type information includes an indication of a number of beam types used in the hierarchical beamforming process and an indication of a number of beams of each of the beam types used in the hierarchical beamforming process; and
   performing a wireless communication action based at least in part on the beam type information.

2. The method of claim 1, wherein the beam types are based at least in part on an antenna array architecture of the second wireless communication device.

3. The method of claim 1, wherein the beam type information includes at least one parameter associated with relative array gain corresponding to a first beam type, relative to a second beam type.

4. The method of claim 3, wherein the beam type information includes an indication that the at least one parameter corresponds to at least one of:
   a relative number of antenna dimensions used for each beam type of a plurality of beam types, or
   an effective number of antenna dimensions used for each beam type of a plurality of beam types.

5. The method of claim 3, wherein the beam type information includes an indication that the at least one parameter corresponds to at least one of:
   an antenna panel,
   an antenna module,
   a coverage area of the antenna panel, or
   a coverage area of the antenna module.

6. The method of claim 5, wherein the beam type information includes an indication that the at least one parameter corresponds to a frequency range of coverage associated with the antenna module.

7. The method of claim 1, further comprising transmitting, to the second wireless communication device, a beam type information reporting configuration that indicates at least one beam type.

8. The method of claim 7, wherein the beam type information reporting configuration further comprises reporting scheduling information.

9. The method of claim 1, wherein reception of the beam type information comprises receiving the beam type information based at least in part on a determination of an activation of the second wireless communication device.

10. The method of claim 1, wherein the beam type information is carried in a capability field.

11. The method of claim 1, wherein reception of the beam type information comprises receiving the beam type information based at least in part on a determination of an updated beam type.

12. The method of claim 1, wherein the hierarchical beamforming process comprises a hybrid beamforming process performed in a hierarchical beamforming manner with different beam types used in each step of a hierarchy of the hierarchical beamforming process.

13. A method of wireless communication performed by a first wireless communication device, comprising:
   receiving, from a second wireless communication device, beam type information associated with at least one beam used by the second wireless communication device for a hierarchical beamforming process, wherein the beam type information includes an indication of a number of beam types used in the hierarchical beamforming process and at least one parameter associated with a relative array gain across beams corresponding to the beam types; and
   performing a wireless communication action based at least in part on the beam type information.

14. The method of claim 13, wherein the beam type information includes an indication of a number of beams of each of the beam types used in the hierarchical beamforming process.

15. The method of claim 13, wherein the at least one parameter associated with the relative array gain comprises an effective isotropic radiated power difference across the beams corresponding to the beam types.

16. The method of claim 13, wherein the beam types are based at least in part on an antenna array architecture of the second wireless communication device.

17. The method of claim 13, wherein the beam type information includes an indication that the at least one parameter corresponds to at least one of:
   a relative number of antenna dimensions used for each beam type of a plurality of beam types, or
   an effective number of antenna dimensions used for each beam type of a plurality of beam types.

18. The method of claim 13, wherein the beam type information includes an indication that the at least one parameter corresponds to at least one of:
   an antenna panel,
   an antenna module,
   a coverage area of the antenna panel, or
   a coverage area of the antenna module.

19. The method of claim 18, wherein the beam type information includes an indication that the at least one parameter corresponds to a frequency range of coverage associated with the antenna module.

20. The method of claim 13, further comprising transmitting, to the second wireless communication device, a beam type information reporting configuration that indicates at least one beam type.

21. The method of claim 20, wherein the beam type information reporting configuration further comprises reporting scheduling information.

22. The method of claim 13, wherein reception of the beam type information comprises receiving the beam type information based at least in part on a determination of an activation of the second wireless communication device.

23. The method of claim 13, wherein the beam type information is carried in a capability field.

24. The method of claim 13, wherein reception of the beam type information includes receiving the beam type information based at least in part on a determination of an updated beam type.

25. The method of claim 13, wherein the hierarchical beamforming process comprises a hybrid beamforming process performed in a hierarchical beamforming manner with different beam types used in each step of a hierarchy of the hierarchical beamforming process.

26. A method of wireless communication performed by a first wireless communication device, comprising:
transmitting, to a second wireless communication device, beam type information associated with at least one beam used by the first wireless communication device for a hierarchical beamforming process, wherein the beam type information includes an indication of a number of beam types used in the hierarchical beamforming process and an indication of a number of beams of each of the beam types used in the hierarchical beamforming process; and
communicating on a wireless communication network based at least in part on the beam type information.

27. The method of claim 26, wherein the beam type information includes at least one parameter associated with relative array gain corresponding to a first beam type, relative to a second beam type.

28. The method of claim 26, further comprising receiving, from the second wireless communication device, a beam type information reporting configuration that indicates at least one beam type.

29. A method of wireless communication performed by a first wireless communication device, comprising:
transmitting, to a second wireless communication device, beam type information associated with at least one beam used by the first wireless communication device for a hierarchical beamforming process, wherein the beam type information includes an indication of a number of beam types used in the hierarchical beamforming process and at least one parameter associated with a relative array gain across beams corresponding to the beam types; and
communicating on a wireless communication network based at least in part on the beam type information.

30. The method of claim 29, wherein the beam type information includes an indication of a number of beams of each of the beam types used in the hierarchical beamforming process.

* * * * *